April 18, 1944.  R. H. WHITELEY  2,346,805
LIQUID COOLED BEARING
Filed Nov. 9, 1942   2 Sheets-Sheet 2
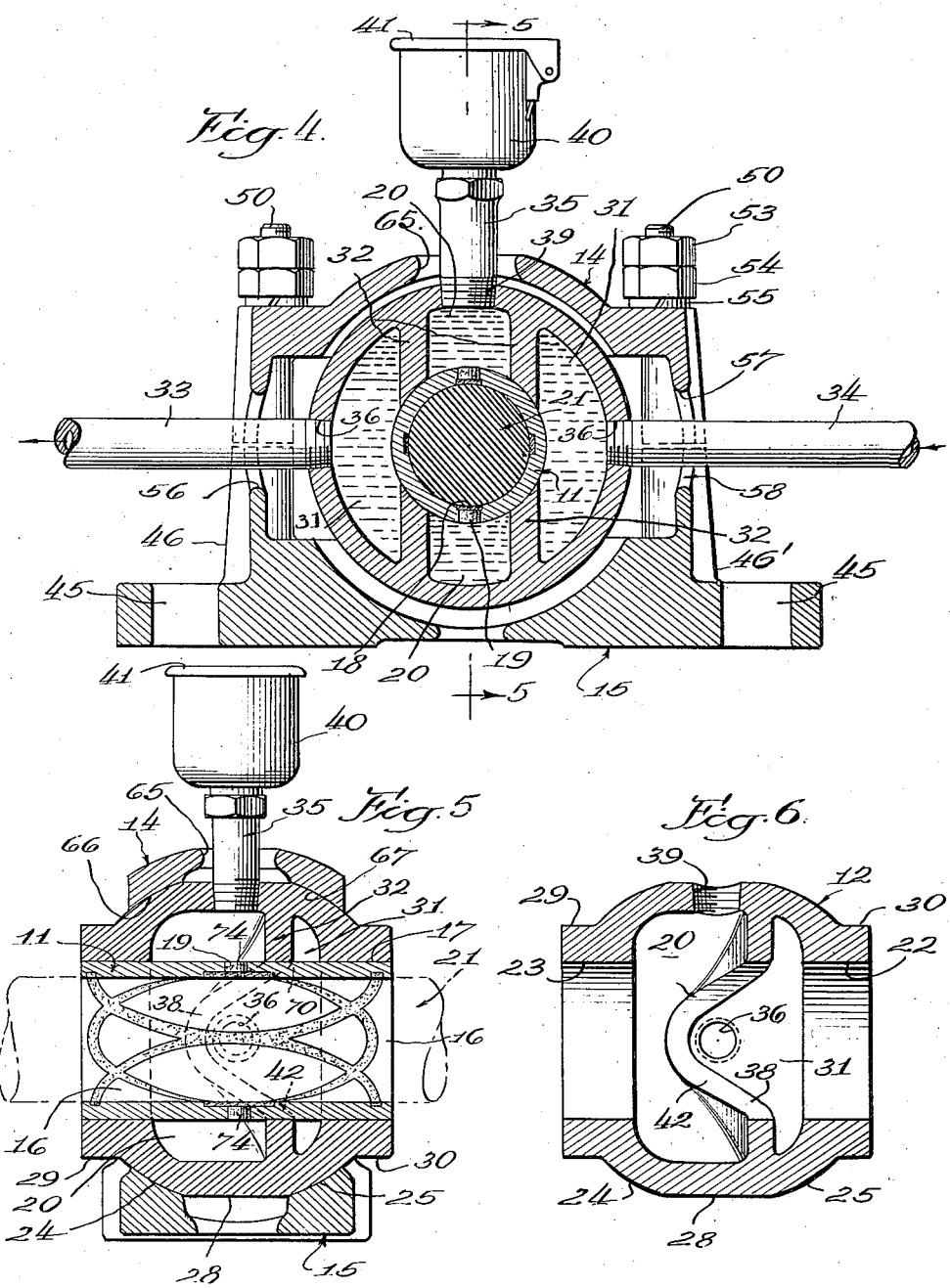
Inventor
Robert H. Whiteley
By McCaleb, Wendt & Dickinson
Attys.

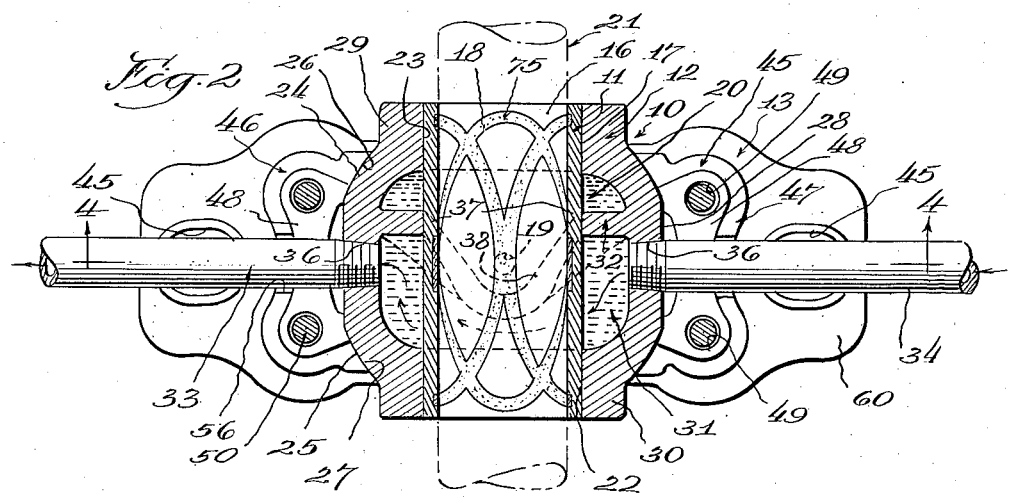

Patented Apr. 18, 1944

2,346,805

UNITED STATES PATENT OFFICE 2,346,805

LIQUID COOLED BEARING

Robert H. Whiteley, Oak Park, Ill., assignor to Randall Graphite Products Corporation, Chicago, Ill., a corporation of Delaware Application November 9, 1942, Serial No. 464,988

8 Claims. (Cl. 308—77)

The present invention relates to liquid cooled bearings, and is particularly concerned with the provision of improved bearings of the self-lubricating type which are also adapted to be cooled by the flow of a cooling liquid.

One of the objects of the invention is the provision of an improved liquid cooled and self-lubricating bearing, which is adapted to be self-aligning, and which is adapted to operate with a minimum amount of noise.

Another object of the invention is the provision of a bearing having provision for cooling, which is adapted to be used with various types of cooling liquids, such as water, alcohol, or anti-freeze solutions, such as ethylene glycol, glycerine, etc., and in which the cooling liquid is adapted to come into direct contact with the bearing bushing so as to remove heat most effectively from the point of its generation.

Another object of the invention is the provision of an improved self-lubricating bearing having provision for permitting the flow of a cooling liquid through a portion of the reservoir of the bearing in contact with the bearing bushing so that the bushing may be constantly cooled by the application of a cooling liquid.

Another object of the invention is the provision of an improved self-lubricating, liquid cooled bearing of the type in which the reservoir is provided with a partition so that two chambers are provided, one of which may be utilized for a supply of lubricant, and the other of which may be utilized for a supply of lubricant, and the other of which may be utilized for cooling liquid.

Another object of the invention is the provision of an improved self-lubricating bearing which is adapted to be operated under relatively high temperature conditions by means of special cooling arrangements which are adapted to keep the bearing cooled under the most adverse operating conditions.

Another object of the invention is the provision of a liquid cooled bearing which is small as compared with the liquid cooled bearings of the prior art, and which requires a minimum amount of raw material and a minimum amount of labor in its construction, so that the cost of the bearing may be reduced to a minimum.

Another object of the invention is the provision of a self-lubricating, temperature-regulated bearing, which is sturdy, simple, capable of economical and efficient lubrication under high temperature conditions, and which may also be used under low temperature conditions by supplying heat to the liquid which circulates through the bearing in contact with the bearing bushing so that it may be operated at the most efficient temperature.

Other objects and advantages of the invention will be apparent from the following description and the accompanying drawings, in which similar characters of reference indicate similar parts throughout the several views.

Referring to the two sheets of drawings accompanying this specification,

Fig. 1 is a side elevational view of a bearing constructed according to the invention, with the shaft shown in cross section, on a plane at right angles to the axis of the shaft;

Fig. 2 is a horizontal sectional view, taken on the plane of the line 2—2 of Fig. 1, looking in the direction of the arrows;

Fig. 3 is a view in partial elevation and partial section of the reservoir member of the bearing, looking upward toward the oil cup aperture from the bottom;

Fig. 4 is a vertical sectional view, taken on the line 4—4 of Fig. 2;

Fig. 5 is a vertical sectional view, taken on the plane of the line 5—5, looking in the direction of the arrows;

Fig. 6 is a sectional view of the reservoir bearing, taken on the same plane as Fig. 5, showing the details of construction of this member.

Referring to Figs. 1–3, the bearing structure 10 preferably includes a bearing bushing 11, a reservoir member 12, and a supporting housing, indicated in its entirety at 13, and comprising a pair of parts 14 and 15.

The bearing bushing is preferably of the type comprising a tubular member of metal, having a substantially cylindrical inner bearing surface 16, and an outer surface 17, which may also be cylindrical.

The inner bearing surface 16 of the bushing 11 may be provided with a plurality of grooves 18, which are preferably of the type that extend, at least in some measure, diagonally of the bearing surface with respect to the axis of the bearing, and also transversely and longitudinally. For example, the grooves 18 in the embodiment of Fig. 2 are of substantially elliptical shape, the elliptical groove formations intersecting each other. At predetermined intersections the grooves communicate with through apertures 19, extending through the wall of the bushing 11 into the lubricant reservoir 20.

The grooves 18 and apertures 19 are filled with an initially plastic carbon compound containing graphite, which is compressed in the grooves and apertures, and baked to a porous condition in place. This compound has lubricating qualities, due to the graphite contained in it.

In some embodiments of the invention the porous compound may be initially projected slightly from the grooves so that when the bearing is worn in, the graphite of the compound will be carried over on the bearing surface 16, giving it a particularly smooth and glassy surface.

The porous carbon compound in the aperture 19 and in the grooves 18 serves as a lubricant-conducting medium, and it conducts lubricant from the reservoir 20 through the aperture 19, and longitudinally of the grooves 18, to all parts of the porous lubricating compound.

From thence the lubricant is spread over the bearing surface of the shaft 21, shown in dotted lines in Fig. 2, and the shaft is constantly lubricated in an effective way by the continuous supply of lubricant to its surface.

The porous compound has the additional property of increasing its flow of lubricant when it becomes heated, so that there is an additional supply of lubricant when the bearing needs it under higher operating temperatures.

The bearing bushing 11 has a liquid-tight frictional fit in the cylindrical bores 22, 23 at each of the ends of the reservoir member 12, into which the bearing bushing is pressed.

The bearing bushing 11 may be made of any suitable bearing metal, such as brass or bronze, but the reservoir 12 is preferably made of cast metal, such as cast iron, although in some embodiments of the invention the reservoir member may be made of a plastic, such as Tenite or Lucite.

The reservoir member 12 is partially spherical in shape, being provided with a pair of partially spherical annular bearing surfaces 24, 25. These bearing surfaces are adapted to engage complementary inner spherical bearing surfaces 26, 27 located on the housing members 14 and 15.

It should be noted that the annular bearing surfaces 26, 27 are narrower in width than the bearing surfaces 24, 25 so as to give the reservoir member a limited amount of universal movement inside the housing members 14, 15.

The ball-shaped reservoir may be provided with a substantially cylindrical surface 28 between the annular spherical surfaces 26, 27, and at each end the ball-shaped member is preferably provided with a cylindrical extension 29, 30.

The aligned bores 22, 23 in the ball-shaped reservoir communicate with two inner chambers 20 and 31, which are separated by a partition 32. These chambers are utilized, one for a supply of lubricant, and the other for passage of a coolant, such as water or any of the other cooling liquids above-mentioned.

Either of the chambers might be used for either the lubricant or coolant; but the partition 32 is preferably so shaped that coolant-conducting pipes 33, 34 and a lubricant filling pipe 35 may all be disposed substantially centrally of the bearing structure.

Thus the partition 32 in Fig. 2 is located laterally of the center of the bearing, that is, toward the upper side of Fig. 2, at each end, so as to leave space for a threaded aperture 36 at each side of the ball-shaped reservoir for the pipe 34 and the pipe 33.

At a point intermediate the end, portions of the partition 32, which curves downwardly in Fig. 2, at 37, form a rounded or U-shaped portion 38 in the partition, which extends downward in Fig. 2 sufficiently to provide space for a threaded aperture 39 in the top of the ball-shaped reservoir member on the upper side of the partition.

This threaded aperture 39 is utilized for receiving the lubricant-conducting pipe 35, which carries an oil cup 40, provided with a spring pressed cover 41.

Due to the particular shape of the partition 32, the oil pipe 35 may be disposed centrally of the bearing, and it communicates with a reservoir 20; and at the same time the coolant pipes 33, 34 may also be disposed centrally of the bearing between the bolts of the housing, while they, nevertheless, communicate with the coolant reservoir 31.

The partition 32 is provided with a through bore 42, which is aligned with the bores 22, 23, and which is accurately machined so that the partition frictionally engages the outside of the bushing 11 to form a liquid-tight partition between the two chambers 20, 31.

It should be understood that in some embodiments of the invention the reservoir will be provided with flexible coolant pipes or conduits 33, 34; but in other embodiments, after the bearing has been set in place and secured, it may utilize relatively stiff pipes, or the relatively stiff pipes may be sufficiently flexible, due to their length, to permit a limited amount of universal movement.

The housing members 14, 15 may serve respectively as a cover member and a base member for supporting the ball reservoir and bushing.

The base member 15 is a cast metal member provided with laterally projecting attaching flanges 43, 44, having oval apertures 45 for the reception of screw bolts, the oval apertures permitting a certain amount of lateral adjustment.

The housing member 15 has upwardly extending portions 46, 46' at each end, and these upwardly extending portions terminate in a flat surface 47, 48.

The upwardly extending portions 45, 46 may be in the form of a thin shell or wall for the purpose of saving material, and the body flange 48 of the lower housing member 15 is provided with four apertures 49 for receiving the four screw bolts 50, which secure the housing parts together.

The bottom of the body flange 48 may be provided with a relatively square socket or a non-circular socket 51 for receiving the square head 52 of each bolt, thus preventing the turning of the bolt as the nuts 53, 54 are driven home on the spring washer 55.

Each wall 45 or 46 is provided with an enlarged half circular groove 56 for passing the pipe 33 or 34 and permitting a limited amount of universal movement of the ball in the housing member, even when the pipe is attached.

The upper housing member 14 is also provided with half circular grooves 57, which, when combined with the lower housing, forms enlarged apertures 58 for the pipes 33, 34.

The lower surface 59 of the lower housing member 15 may be relieved at certain points, but is preferably provided with a plane surface 60 surrounding the bolt apertures 45 at each end for engagement with a support, to which the bearing is to be secured.

In between the wall portions 46 and 46' the lower housing member 15 is provided with the partially spherical and half annular bearing surfaces 27 spaced from each other longitudinally of the shaft and arranged in such manner that these partially spherical surfaces are all located on the same radius, that is, the radius on which the outer spherical surfaces 24 and 25 of the ball reservoir are formed.

The upper housing member 14 is similar in construction in that it also preferably comprises a shell with thin outer walls 61, 62 at each end surrounding the four bolts 50 and curved concentrically to the bolts and terminating in a flat upper wall 63 at the top of each end.

The upper wall 64 between the flat portions 63 is substantially spherical, and it is provided with an enlarged oval aperture 65 at the center top for passing the oil conduit 35 and permitting universal movement of the ball reservoir.

The walls 61, 62 of the upper housing are joined by the central spherical portion 64 and provided with inner partially spherical bearing surfaces 66, 67 (see Fig. 5) for engaging the top of the ball. These partially spherical surfaces 66, 67 are half annular and parallel to each other and formed on the same radius as the surfaces 26 and 27 in the lower housing member.

Thus the ball is engaged at the top and the bottom at each end with an annular partially spherical surface so that it may have a universal movement in the upper and lower housing members. The depth of these spherical formations in the housing members is preferably such that there is a clearance or crack 68 between the upper and lower housing members when they are placed together as shown in Fig. 1, so that a predetermined pressure may be placed on the ball reservoir by the upper and lower housing members.

This prevents rattling, and spring washers 55 may be used to keep the pressure at a predetermined amount so as to take up wear and hold the ball reservoir for nonrattling universal movement at all times.

The lock nuts 53, 54 are adapted to hold their adjustment on the bolts 50 at all times so that the end thrust of the spring washers 55 may be used for placing a predetermined resilient pressure on the housing halves.

Referring to Figs. 4 to 6, these are the other views showing details of construction of the bearing. It will be observed that the cooling liquid may come in at one side of the bearing into contact with the bearing bushing, and may then pass out the other side of the bushing. In some embodiments of the invention the partition, as shown in Fig. 4, may be placed in a different position, rotated 90 degrees from the present position so that the coolant pipes will be located in the plane of the present location of the lubricant pipe, and the lubricant pipe located where one coolant pipe is shown in Fig 4.

By means of this partition construction the coolant pipes and lubricant pipe 35 may again be disposed centrally of the bearing, making the assembly symmetrical and giving it adequate strength at all sides.

Furthermore, the piping arrangements do not interfere with the symmetrical location of the partially spherical and annular bearing surfaces on the ball and the housing halves.

The operation of my self-lubricating liquid cooled bearing is as follows: The plugs 74 in the through apertures 19 of the bearing bushing 11 are always located to communicate with the lubricant reservoir 20, no such plugs being provided in the bushing wall, where the coolant reservoir 31 engages the bushing.

Porous carbon compound 75 in the grooves 18 serves to conduct lubricant along the grooves from the plugs 74, which conduct the lubricant from the oil reservoir 20. Thus the entire bearing surface 16 is provided with lubricant from the reservoir.

The plugs 74 are preferably symmetrically located with respect to the network of grooves 18 so that all parts of the bearing will be fed in the same way.

The reservoir 20 is preferably filled with a supply of lubricant, which melts at a little above the usual operating temperature, such as Vaseline, and this lubricant may be melted at the time it is placed in the cup 40, to pass down into the reservoir 20 by means of the pipe 35.

The coolant pipes 33, 34 may connect to any type of radiator capable of dissipating the heat of the coolant or a constant in the supply of cooling liquid, such as water from the water supply, may be connected to pass in one pipe 34 and out the other pipe 33.

In some embodiments of the invention there will be a circulating system for the coolant, including the reservoir 20, the pipes 33, 34, a radiator, and a liquid pump.

The coolant, being in direct contact with the exterior surface of the bearing bushing, it is adapted to absorb heat more quickly and to carry it away more effectively than any of the devices of the prior art.

Although the coolant does not engage the full outer area of the bushing, the bushing is adapted to conduct heat from those portions where it is not engaged by coolant to those portions where the coolant directly engages the bushing, and there is only a slight differential of temperature between the different parts of the bushing.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a self-lubricating liquid cooled bearing, the combination of a bearing bushing provided with grooves and through conduits communicating with said grooves, said grooves and through conduits being filled with porous carbon lubricant conducting composition, a reservoir member having a pair of aligned bores for engaging the outside of said bushing, said reservoir member having an enlargement formed intermediate its ends, and said enlargement having a pair of recesses formed therein to form chambers when said reservoir is secured about said bushing, one of said chambers connecting with said through apertures in said bushing, and the other of said chambers having inlet and outlet ports for admission and discharge of cooling liquid, said chambers being separated by a partition laterally curved at its central portion whereby the liquid outlet and inlet ports and a lubricant inlet port may be located centrally of said reservoir member.

2. In a liquid cooled bearing of the reservoir type, the combination of a bearing bushing having its bearing surface provided with grooves and having apertures leading from certain of said grooves through said bushing, said apertures and said grooves being filled with an initially plastic porous lubricant conducting compound baked in place, and a reservoir body, said reservoir body having three inwardly extending flanges separated by annular chambers, and said inwardly extending flanges terminating at the walls of aligned bores for receiving said bushing, said bushing having a liquid-tight frictional fit in said bores, single conduit means communicating with one of said chambers to provide a supply of lubricant, and inlet and outlet conduit means communicating with the other of said chambers to supply a liquid coolant, said porous carbon conducting members in said apertures communicating with that portion of the reservoir housing having the first-mentioned chamber for lubricant whereby the bearing surface is constantly supplied with lubricant and maintained at a predetermined temperature by means of the coolant in the other chamber of said reservoir housing, the coolant being in direct contact with the exterior of said bushing.

3. In a liquid cooled bearing of the reservoir type, the combination of a bearing bushing having its bearing surface provided with grooves and having apertures leading from certain of said grooves through said bushing, said apertures and said grooves being filled with an initially plastic porous lubricant conducting compound baked in place, and a reservoir body, said reservoir body having three inwardly extending flanges separated by annular chambers, and said inwardly extending flanges terminating at the walls of aligned bores for receiving said bushing, said bushing having a liquid-tight frictional fit in said bores, single conduit means communicating with one of said chambers to provide a supply of lubricant, and inlet and outlet conduit means communicating with the other of said chambers to supply a liquid coolant, said porous carbon conducting members in said apertures communicating with that portion of the reservoir housing having the first-mentioned chamber for lubricant whereby the bearing surface is constantly supplied with lubricant and maintained at a predetermined temperature by means of the coolant in the other chamber of said reservoir housing, the coolant being in direct contact with the exterior of said bushing, two of said inwardly extending flanges being located at the ends of said reservoir, and the other of said inwardly extending flanges being located intermediate the ends.

4. In a liquid cooled bearing of the reservoir type, the combination of a bearing bushing having its bearing surface provided with grooves and having apertures leading from certain of said grooves through said bushing, said apertures and said grooves being filled with an initially plastic porous lubricant conducting compound baked in place, and a reservoir body, said reservoir body having three inwardly extending flanges separated by annular chambers, and said inwardly extending flanges terminating at the walls of aligned bores for receiving said bushing, said bushing having a liquid-tight frictional fit in said bores, single conduit means communicating with one of said chambers to provide a supply of lubricant, and inlet and outlet conduit means communicating with the other of said chambers to supply a liquid coolant, said porous carbon conducting members in said apertures communicating with that portion of the reservoir housing having the first-mentioned chamber for lubricant whereby the bearing surface is constantly supplied with lubricant and maintained at a predetermined temperature by means of the coolant in the other chamber of said reservoir housing, the coolant being in direct contact with the exterior of said bushing, two of said inwardly extending flanges being located at the ends of said reservoir, and the other of said inwardly extending flanges being located intermediate the ends, and said latter inwardly extending flange having a laterally curved portion whereby the conduits communicating with the grooved portions for lubricant and coolant may be located centrally of the reservoir body.

5. In a liquid cooled bearing of the reservoir type, the combination of a bearing bushing having its bearing surface provided with grooves and having apertures leading from certain of said grooves through said bushing, said apertures and said groves being filled with an initially plastic porous lubricant conducting compound baked in place, and a reservoir body, said reservoir body having three inwardly extending flanges separated by annular chambers, and said inwardly extending flanges terminating at the walls of aligned bores for receiving said bushing, said bushing having a liquid-tight frictional fit in said bores, single conduit means communicating with one of said chambers to provide a supply of lubricant, and inlet and outlet conduit means communicating with the other of said chambers to supply a liquid coolant, said porous carbon conducting members in said apertures communicating with that portion of the reservoir housing having the first-mentioned chamber for lubricant whereby the bearing surface is constantly supplied with lubricant and maintained at a predetermined temperature by means of the coolant in the other chamber of said reservoir housing, the coolant being in direct contact with the exterior of said bushing, two of said inwardly extending flanges being located at the ends of said reservoir, and the other of said inwardly extending flanges being located intermediate the ends, and means for supporting said reservoir, comprising a pair of housing members, said housing members being formed with a pair of annular partially spherical engaging surfaces, and said reservoir having complementary engaging surfaces of greater width whereby the reservoir is mounted for universal movement in the housing.

6. In a liquid cooled bearing of the reservoir type, the combination of a bearing bushing having its bearing surface provided with grooves and having apertures leading from certain of said grooves through said bushing, said apertures and said grooves being filled with an initially plastic porous lubricant conducting compound baked in place, and a reservoir body, said reservoir body having three inwardly extending flanges separated by annular chambers, and said inwardly extending flanges terminating at the walls of aligned bores for receiving said bushing, said bushing having a liquid-tight frictional fit in said bores, single conduit means communicating with one of said chambers to provide a supply of lubricant, and inlet and outlet conduit means communicating with the other of said chambers to supply a liquid coolant, said porous carbon conducting members in said apertures communicating with that portion of the reservoir housing having the first-mentioned chamber for lubricant whereby the bearing surface is constantly supplied with lubricant and maintained at a predetermined temperature by means of the coolant in the other chamber of said reservoir housing, the coolant being in direct contact with the exterior of said bushing, two of said inwardly extending flanges being located at the ends of said reservoir, and the other of said inwardly extending flanges being located intermediate the ends, and means for supporting said reservoir, comprising a pair of housing members, said housing members being formed with a pair of annular partially spherical engaging surfaces, and said reservoir having complementary engaging surfaces of greater width whereby the reservoir is mounted for universal movement in the housing, said housing being provided with oppositely located apertures for lubricant conduits and for coolant conduits.

7. In a liquid cooled bearing of the reservoir type, the combination of a bearing bushing having its bearing surface provided with grooves and having apertures leading from certain of said grooves through said bushing, said apertures and said grooves being filled with an initially plastic porous lubricant conducting compound baked in place, and a reservoir body, said reservoir body having three inwardly extending flanges separated by annular chambers, and said inwardly extending flanges terminating at the walls of aligned bores for receiving said bushing, said bushing having a liquid-tight frictional fit in said bores, single conduit means communicating with one of said chambers to provide a supply of lubricant, and inlet and outlet conduit means communicating with the other of said chambers to supply a liquid coolant, said porous carbon conducting members in said apertures communicating with that portion of the reservoir housing having the first-mentioned chamber for lubricant whereby the bearing surface is constantly supplied with lubricant and maintained at a predetermined temperature by means of the coolant in the other chamber of said reservoir housing, the coolant being in direct contact with the exterior of said bushing, two of said inwardly extending flanges being located at the ends of said reservoir, and the other of said inwardly extending flanges being located intermediate the ends, and means for supporting said reservoir, comprising a pair of housing members, said housing members being formed with a pair of annular partially spherical engaging surfaces, and said reservoir having complementary engaging surfaces of greater width whereby the reservoir is mounted for universal movement in the housing, said housing being provided with oppositely located apertures for lubricant conduits and for coolant conduits, and said apertures being of enlarged size with respect to said conduits to permit the universal movement of the reservoir member.

8. In a self-lubricating liquid cooled bearing, the combination of a bearing bushing provided with grooves and through conduits communicating with said grooves, said grooves and through conduits being filled with porous carbon lubricant conducting composition, a reservoir member having a pair of aligned bores for engaging the outside of said bushing, said reservoir member having an enlargement formed intermediate its ends, and said enlargement having a pair of recesses formed therein to form chambers when said reservoir is secured about said bushing, one of said chambers connecting with said through apertures in said bushing, and the other of said chambers having inlet and outlet ports for admission and discharge of cooling liquid, said chambers being separated by a partition engaging the outside of said bushing, whereby both the lubricant and coolant may be located in said chambers, the former being in communication with said porous carbon conducting composition, and the latter being in direct contact with the exterior of said bushing.

R. H. WHITELEY.